United States Patent
Bedrine et al.

(10) Patent No.: US 8,657,566 B2
(45) Date of Patent: Feb. 25, 2014

(54) TURBINE ENGINE INCLUDING A REVERSIBLE ELECTRIC MACHINE

(75) Inventors: Olivier Bedrine, Bosdarros (FR); Monique Fos, Rontignon (FR); Jean-Luc Frealle, Pau (FR); Gerald Senger, Morlaas-Berlanne (FR)

(73) Assignee: Turbomeca, Bordes (FR)

( * ) Notice: Subject to any disclaimer, the term of this patent is extended or adjusted under 35 U.S.C. 154(b) by 601 days.

(21) Appl. No.: 12/934,848

(22) PCT Filed: Mar. 24, 2009

(86) PCT No.: PCT/EP2009/053408
§ 371 (c)(1),
(2), (4) Date: Nov. 16, 2010

(87) PCT Pub. No.: WO2009/118298
PCT Pub. Date: Oct. 1, 2009

(65) Prior Publication Data
US 2011/0049891 A1    Mar. 3, 2011

(30) Foreign Application Priority Data
Mar. 25, 2008 (FR) ..................................... 08 51890

(51) Int. Cl.
*F02C 7/268* (2006.01)
(52) U.S. Cl.
USPC ......................................................... 415/123
(58) Field of Classification Search
USPC ................................. 415/123, 122.1; 60/39.15
See application file for complete search history.

(56) References Cited

U.S. PATENT DOCUMENTS

| | | | | |
|---|---|---|---|---|
| 2,558,840 A | * | 7/1951 | Gordon | 123/179.31 |
| 2,723,531 A | * | 11/1955 | Wosika et al. | 60/718 |
| 3,635,019 A | * | 1/1972 | Kronogard et al. | 60/39.163 |
| 3,683,719 A | * | 8/1972 | Gros | 74/661 |
| 3,965,673 A | * | 6/1976 | Friedrich | 60/788 |
| 5,343,778 A | * | 9/1994 | Romero et al. | 74/661 |

(Continued)

FOREIGN PATENT DOCUMENTS

| | | |
|---|---|---|
| EP | 1 712 761 | 10/2006 |
| EP | 1 731 735 | 12/2006 |
| JP | 2001-193476 | 7/2001 |
| JP | 2006-291948 | 10/2006 |

OTHER PUBLICATIONS

U.S. Appl. No. 13/703,530, filed Dec. 11, 2012, Bedrine, et al.

(Continued)

*Primary Examiner* — Edward Look
*Assistant Examiner* — Liam McDowell
(74) *Attorney, Agent, or Firm* — Oblon, Spivak, McClelland, Maier & Neustadt, L.L.P.

(57) ABSTRACT

A turbine engine, for example for a helicopter, the engine including a gas generator and a free turbine driven in rotation by a gas stream generated by the gas generator, the turbine engine further including a reversible electric machine for coupling to the gas generator, the reversible electric machine configured to set the gas generator into rotation during a stage of starting the turbine engine. To generate electricity, the reversible electric machine is also configured to be coupled to the free turbine after the turbine engine has started.

14 Claims, 2 Drawing Sheets

(56) References Cited

U.S. PATENT DOCUMENTS

| | | | |
|---|---|---|---|
| 7,185,496 | B2 | 3/2007 | Herlihy |
| 8,337,171 | B2 * | 12/2012 | Agner et al. ............... 417/319 |
| 2005/0056021 | A1 | 3/2005 | Belokon et al. |
| 2006/0225431 | A1 | 10/2006 | Kupratis |
| 2006/0272313 | A1 | 12/2006 | Eick et al. |
| 2009/0302152 | A1 * | 12/2009 | Knight ............................ 244/58 |
| 2010/0212326 | A1 * | 8/2010 | Vialle ............................. 60/778 |

OTHER PUBLICATIONS

International Search Report issued Jul. 3, 2009 in PCT/EP09/53408 filed Mar. 24, 2009.

Office Action issued Apr. 30, 2013 in Japanese Patent Application 2011-501194 (English Translation).

* cited by examiner

TURBINE ENGINE INCLUDING A REVERSIBLE ELECTRIC MACHINE

BACKGROUND OF THE INVENTION

1. Field of the Invention

The present invention relates to the field of gas turbines and in particular that of turbine engines and turboprops, for aircraft such as helicopters, airplanes, and other probable applications for these types of engine.

More particularly, the present invention relates to a turbine engine, in particular for a helicopter, the engine comprising a gas generator and a free turbine driven in rotation by a gas stream generated by the gas generator, the turbine engine further including a reversible electric machine for coupling to the gas generator, said reversible electric machine being suitable for setting the gas generator into rotation during a stage of starting the turbine engine.

2. Description of the Related Art

Conventionally, the gas generator comprises at least a compressor and a turbine that are coupled together in rotation. The principle of operation is as follows: fresh air entering into the turbine engine is compressed because of the rotation of the compressor, prior to being delivered to a combustion chamber where it is mixed with fuel. The gas burnt by the combustion is then exhausted at high speed.

This gas then expands initially in the turbine of the gas generator so that the turbine extracts therefrom the energy needed for driving the compressor.

The turbine of the gas generator does not absorb all of the kinetic energy of the burnt gas, and the remaining kinetic energy corresponds to the gas stream as generated by the gas generator.

This stream thus supplies kinetic energy to the free turbine such that the gas expands a second time in the free turbine, which serves to transform its kinetic energy into mechanical energy in order to drive a driven member, such as a helicopter rotor.

While starting the turbine engine, it is necessary to drive the gas generator in rotation, in other words to drive rotation of the compressor coupled to the turbine. As mentioned above, this is specifically one of the roles of the reversible electric machine, which is itself known from elsewhere, and which is usually an electric motor also suitable for operating in reversible manner as an electricity generator.

By using the reversible electric machine operating as a motor to drive rotation of the compressor, it is possible to cause air to flow through the compressor and thus to bring compressed air into the combustion chamber in order to initiate combustion.

The combustion then produces the gas stream that enables the turbine to be driven in rotation, whereupon rotation of the compressor is driven directly by the turbine, which means that the gas generator is operating in self-contained manner, in other words that the turbine engine has indeed started.

It is known that the aircraft in which such turbine engines are fitted include electrical equipment that needs to be powered with electricity.

For example, in a helicopter, it is necessary to provide electrical power for the electrical equipment with which it is fitted, such as for example electric controls, heating, air conditioning, a mechanical winch.

Until now, while in flight, the reversible electric machine has been used to deliver electricity for the electrical equipment. For this purpose, and as described in document EP 1 712 761, the electric machine operates as an electricity generator and is driven in rotation by the gas generator, with the rotary kinetic energy taken from the gas generator being transformed into electrical energy by said machine.

However, in a helicopter, taking kinetic energy from the gas generator involves drawbacks.

In flight, varying the amount of mechanical power taken off from the gas generator by the electric machine gives rise to a shift of the operating line of the engine in the compressor field.

This shift corresponds to a pumping margin that needs to be ensured, thus having the consequences:

of penalizing optimization of the engine operating line, by preventing the compressor being used at an optimum compression ratio; and of thus degrading stabilized performance, with an impact on specific fuel consumption.

BRIEF SUMMARY OF THE INVENTION

An object of the present invention is to propose a turbine engine, in particular for a helicopter, that remedies the above-mentioned drawbacks.

The invention achieves this object by the fact that, in order to generate electricity, the reversible electric machine is also designed to be coupled to the free turbine after the turbine engine has started.

In other words, in flight, rotation of the reversible electric machine operating as an electricity generator is advantageously driven by the free turbine, such that the kinetic energy for transformation into electrical energy is advantageously taken from the free turbine.

The inventors have observed that taking a certain quantity of kinetic energy from the free turbine has significantly less effect on the efficiency of the turbine engine than taking the same quantity of kinetic energy from the gas generator. This is due to the particular configuration of the thermodynamic cycle of such a turbine engine.

As a result, the turbine engine of the invention advantageously enables electricity to be supplied without excessively penalizing the efficiency of the engine.

Furthermore, in flight, the pilotability of a helicopter fitted with the turbine engine of the invention is much less affected, insofar as the capacity of the gas generator for acceleration is preserved.

Furthermore, in the invention, it is the same reversible electric machine that serves to start the gas generator and to supply electricity.

Advantageously, the reversible electric machine is coupled to a shaft of the gas generator via first deactivatable coupling means, said reversible machine is coupled to a shaft of the free turbine via second deactivatable coupling means, and the first and second coupling means are configured so as not to be activated simultaneously.

The term "deactivatable coupling means" is used to indicate that said coupling means may be in an activated position in which the members connected to said coupling means are coupled together, or in a deactivated position in which said members are decoupled, it being understood that the term "member" covers the electric machine, the gas generator, and the free turbine.

In the invention, when the first coupling means are activated, the second coupling means are deactivated, i.e. the reversible electric machine is coupled to the gas generator while being uncoupled from the free turbine, while conversely, when the second coupling means are activated, the first coupling means are deactivated, i.e. the electric machine is coupled to the free turbine while being decoupled from the gas generator.

Without going beyond the ambit of the invention, it is also possible to provide an intermediate position in which both the first and second coupling means are deactivated simultaneously.

In accordance with the invention, the reversible electric machine operates as an electric motor when the first coupling means are activated so as to drive rotation of the gas generator while starting the turbine engine.

Correspondingly, the reversible electric machine operates as an electricity generator when the second coupling means are activated so as to produce electricity by taking kinetic energy from the free turbine, with this taking place after the turbine engine has started, i.e. essentially in flight.

Because the first and second coupling means cannot be activated simultaneously, there is no danger of the harmful situation occurring in which the free turbine drives the gas generator in rotation.

Advantageously, the first and/or second coupling means comprise freewheels.

The advantage of using a freewheel is that it does not need to be controlled electronically or mechanically by an external operator.

Such a freewheel is generally constituted by a hub and a peripheral ring mounted to rotate on the hub. The hub may drive the peripheral ring in rotation, but not vice versa. Thus, the hub can drive the ring only when the hub is turning in a predetermined direction, referred to as the "engagement direction". Otherwise, the hub and the peripheral ring rotate freely relative to each other.

Specifically, the deactivatable coupling means are activated when the hub of the freewheel drives the peripheral ring in rotation, and conversely the deactivatable coupling means are deactivated when the hub of the freewheel does not drive the peripheral ring in rotation.

Preferably, the first and second coupling means comprise a first freewheel, the second coupling means comprise a second freewheel, and the first and second freewheels are mounted in opposition.

The term "mounted in opposition" is used to mean that the first freewheel can transmit rotary torque coming from the electric machine, whereas the second freewheel can transmit rotary torque going to the electric machine.

Advantageously, the first and/or second coupling means further comprise stepdown gears.

The term "stepdown gear" is used to mean one or more stepdown stages, e.g. comprising gear trains. Such stepdown gears are known from elsewhere.

Since the gas generator and the free turbine generally rotate substantially faster than the reversible electric machine, the stepdown gear serves to match the speed of rotation of the reversible electric machine to the speeds of the gas generator and of the free turbine.

Advantageously, the first coupling means comprise a first stepdown gear having a first stepdown coefficient, while the second coupling means comprise a second stepdown gear having a second stepdown coefficient, and in that the ratio of the first and second stepdown coefficients is less than a first limit value.

Preferably this first limit value is selected so that the first and second freewheels are not engaged simultaneously.

Preferably, this first limit value is proportional to the ratio of the nominal speed of the gas generator divided by the nominal speed of the free turbine. Preferably, the coefficient of proportionality is strictly less than 1.

In another embodiment of the invention, the reversible electric machine is also suitable for being coupled to the gas generator in order to generate electricity.

Preferably, the reversible electric machine is suitable for being coupled to the gas generator after the turbine engine has started and while the free turbine is rotating at low speed or indeed is blocked, such that the reversible electric machine operating as an electricity generator then advantageously delivers electricity by taking kinetic energy from the gas generator.

Advantageously, the reversible electric machine is suitable for being coupled to the shaft of the gas generator by third deactivatable coupling means, and the first, second, and third coupling means are configured in such a manner that only one of said coupling means is activated at a time.

In other words, when the third coupling means are activated, the first and second coupling means are deactivated, i.e. the reversible electric machine is coupled to the gas generator solely via the third coupling means, while being decoupled from the free turbine.

Preferably, the third coupling means are distinct from the first coupling means.

Preferably, the third coupling means comprise a third freewheel.

Advantageously, the first and third freewheels are mounted in opposition.

As a result the first and third freewheels cannot be engaged simultaneously.

Preferably, but not necessarily, the third coupling means further include dog-clutch forming means.

Under such circumstances, the dog clutch serves to activate or deactivate the third coupling means, while the third freewheel facilitates clutching and declutching insofar as these actions are performed at zero torque.

In another variant embodiment, the third coupling means comprise a hydraulic coupler replacing the dog clutch and third freewheel.

When the turbine engine of the invention has three freewheels, the third coupling means also advantageously include a third stepdown gear having a third stepdown coefficient, and the ratio of the second and third stepdown coefficients is greater than a second limit value.

This second limit value is selected in such a manner that, in flight, the gas generator does not drive rotation of the reversible electric machine operating as a generator.

Preferably, this second limit value is proportional to the ratio of the nominal speed of the gas generator divided by the nominal speed of the free turbine.

Preferably, the coefficient of proportionality is strictly greater than 1.

BRIEF DESCRIPTION OF THE SEVERAL VIEWS OF THE DRAWINGS

The invention can be better understood and its advantages appear better on reading the following description of embodiments given as non-limiting examples. The description refers to the accompanying drawings, in which.

DETAILED DESCRIPTION OF THE INVENTION

Figure 1:
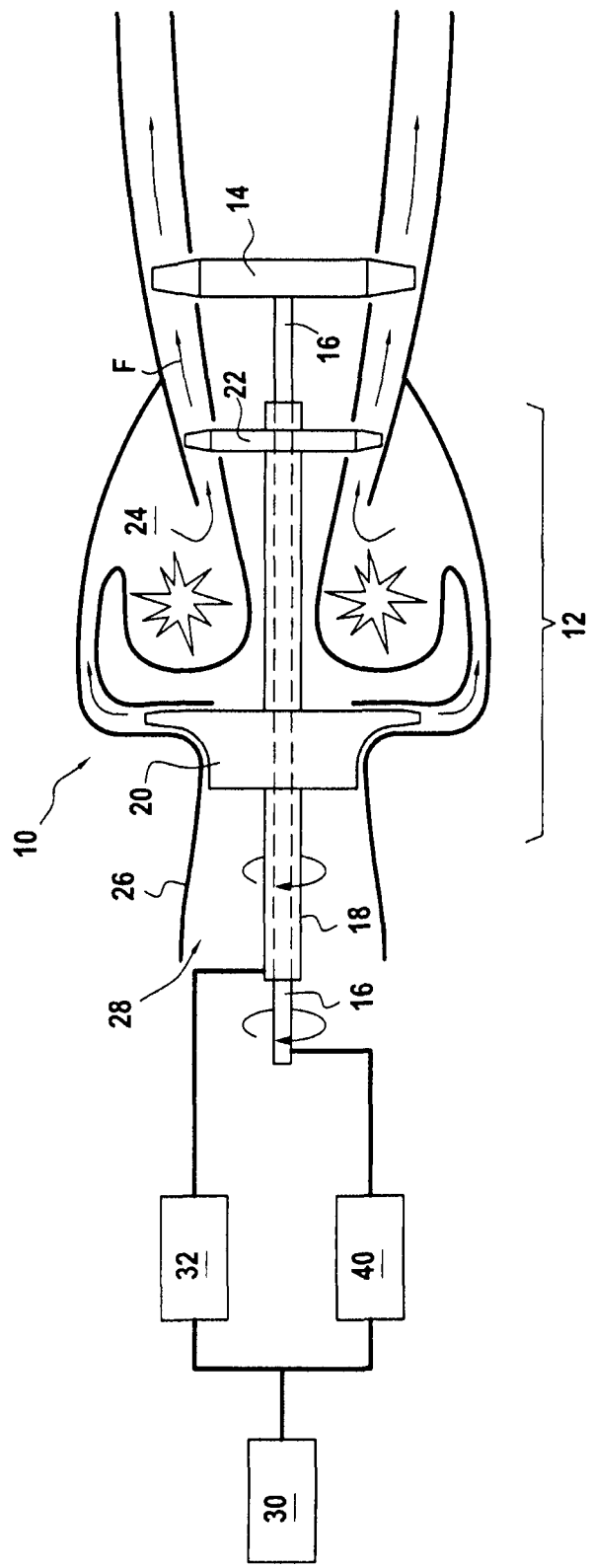
FIG. 1 is a section view of a turbine engine of the invention.

FIG. 1 is a diagram of a turbine engine 10 constituting a first embodiment of the invention for use in particular in rotating a helicopter rotor (not shown), the turbine engine 10 comprising a gas generator 12 and a free turbine 14 suitable for being driven in rotation by a stream of gas generated by the gas generator 12.

The free turbine 14 is mounted on a shaft 16 that transmits the rotary movement to a driven member such as a helicopter main rotor.

The turbine engine 10 shown in FIG. 1 is of the type with power takeoff being from the front with delivery via a coaxial shaft. Without going beyond the ambit of the present invention, it is entirely possible for the free turbine turbine engine to be of the type with power takeoff at the front being delivered by an external shaft, or indeed a free turbine turbine engine of the type with power takeoff at the rear.

The gas generator includes a rotary shaft 18 having mounted thereon both a compressor 20 and a turbine 22, together with a combustion chamber 24 that is located axially between the compressor 20 and the turbine when the gas generator 12 is considered in the axial direction of the rotary shaft 18.

The turbine engine 10 presents a casing 26 provided with an air inlet 28 through which fresh air enters into the gas generator 12.

After being admitted into the enclosure of the gas generator 12, the fresh air is compressed by the compressor 20, which delivers it to the inlet of the combustion chamber 24 in which it is mixed with fuel.

The combustion that takes place in the combustion chamber 24 causes burnt gas to be exhausted at high speed towards the turbine 22, thereby having the effect of driving the shaft 18 of the gas generator 12 in rotation, and consequently driving the compressor 20.

The speed of rotation of the shaft 18 of the gas generator 12 is determined by the flow rate of fuel penetrating into the combustion chamber 24.

In spite of kinetic energy being extracted by the turbine 22, the gas stream leaving the gas generator presents significant kinetic energy.

As can be understood from FIG. 1, the gas stream F is directed towards the free turbine 14, thereby having the effect of causing the gas to expand in the free turbine 14 and thus leading to the turbine wheel and the shaft 16 being set into rotation.

The turbine engine 10 also includes a reversible electric machine 30 constituted specifically by an electric motor suitable for operating reversibly as an electricity generator.

The reversible electric machine 30 is mechanically coupled to the shaft 18 of the gas generator 12 via first deactivatable coupling means 32.

Figure 2:
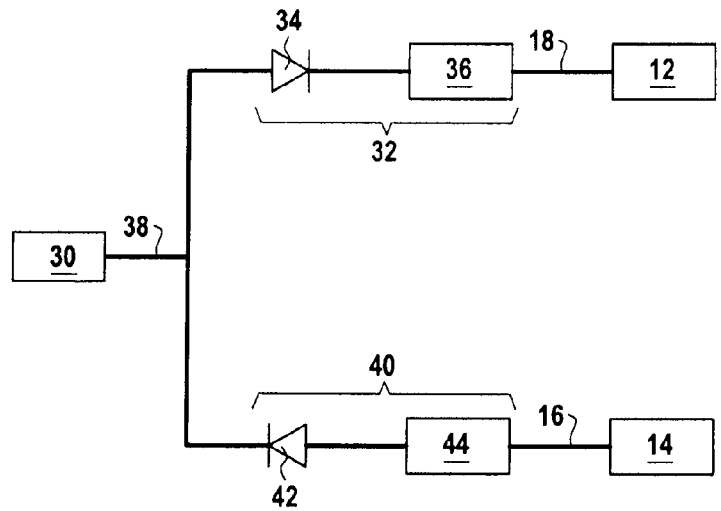
FIG. 2 is a diagram of a first embodiment of the invention in which the turbine engine includes first and second coupling means.

More precisely, and as can be seen in FIG. 2, the first deactivatable coupling means 32 comprise a first freewheel 34 and preferably a first stepdown gear 36 that has a first stepdown coefficient K1 and that is located between the shaft 18 and the first freewheel 34.

The first freewheel is mounted in such a manner that rotation of the shaft 38 of the reversible electric machine 30 can drive rotation of the shaft 18 of the gas generator 12 when the reversible electric machine 30 is operating as an electric motor (first coupling means activated), while on the contrary, rotation of the shaft 18 of the gas generator 12 cannot drive rotation of the shaft 38 of the reversible electric machine 30 (first coupling means deactivated).

In other words, the first freewheel 34 can transfer rotary torque only from the reversible electric machine 30 to the gas generator 12, and not in the opposite direction.

Thus, rotation of the shaft 38 of the reversible electric machine 30 is suitable for driving rotation of the shaft 18 of the gas generator 12 in order to start it. Once the gas generator 12 has started, the reversible electric machine no longer drives rotation of the gas generator 12.

Advantageously, the first stepdown coefficient K1 is selected so that the speed of the reversible electric machine is matched to the speed range required for starting the engine.

In accordance with the invention, the reversible electric machine 30 is also suitable for being coupled to the free turbine 14, advantageously via second coupling means 40, so that, when operating as an electricity generator, said reversible electric machine is suitable for being driven in rotation by the free turbine 14 in order to supply electricity.

As can be seen in FIG. 2, the second coupling means 40 comprise a second freewheel 42 similar to the first freewheel 34 and connected to the shaft 38 of the reversible electric machine.

The second coupling means 40 also include a second stepdown gear 44 located between the second freewheel 42 and a shaft 16 of the free turbine.

The second stepdown gear 44 has a second stepdown coefficient K2 selected in such a manner that the speed of the reversible electric machine is adapted to the speed range required for enabling it to supply electricity.

The second freewheel 42 is mounted in such a manner that it can transmit rotary torque solely from the shaft 16 of the free turbine 14 towards the shaft 38 of the electric machine 30.

In other words, because of the second freewheel, the reversible electric machine 30 may be driven by the free turbine 14 (second coupling means activated) but cannot drive said free turbine (second coupling means deactivated).

When the free turbine 14 drives rotation of the reversible electric machine 30, the machine operates as an electricity generator and produces electricity.

As can be seen in FIG. 2, the first and second freewheels are mounted in opposition.

Specifically, they present opposite engagement directions.

Thus, when the reversible electric machine operating as a motor drives rotation of the shaft 18 of the gas generator (first freewheel engaged, i.e. first coupling means activated), the second freewheel does not transmit rotary torque from the reversible electric machine to the shaft 16 of the free turbine 14 (second coupling means deactivated).

Conversely, when the shaft 16 of the free turbine 14 drives rotation of the shaft 38 of the reversible electric machine 30 operating as an electricity generator (second freewheel engaged, i.e. second coupling means activated), it is arranged that the first freewheel does not transmit rotary torque from the shaft 38 of the reversible electric machine to the shaft 18 of the gas generator (first coupling means deactivated).

As can be seen in FIG. 2, the first and second freewheels are both connected to the shaft 38 of the reversible electric machine 30.

In order to avoid the free turbine 14 driving rotation of the shaft 18 of the gas generator 12, it is necessary for the first freewheel not to be engaged.

To achieve this, the stepdown coefficients K1 and K2 of the first and second stepdown gears may optionally be selected as follows, for example:

$$\frac{K1}{K2} < \lambda_{min} * \frac{|100\% \ NG|}{|100\% \ NTL|}$$

where:
  100% NG is the nominal speed of rotation of the shaft 18 of the gas generator 12;

100% NTL is the nominal speed of rotation of the shaft 16 of the free turbine 14; and $\lambda_{min}$, a proportionality coefficient, is preferably equal to the smallest value of the ratio:

$$\frac{NG(t)}{NTL(t)}, \forall\, t$$

In other words, the ratio of the first and second stepdown coefficients K1 and K2 is less than a first limit value L1 where:

$$L1 = \lambda_{min} * \frac{|100\%\ NG|}{|100\%\ NTL|}$$

For this first limit value L1, the inventors have found that the first and second coupling means are never activated simultaneously during operation of the turbine engine.

Figure 3:
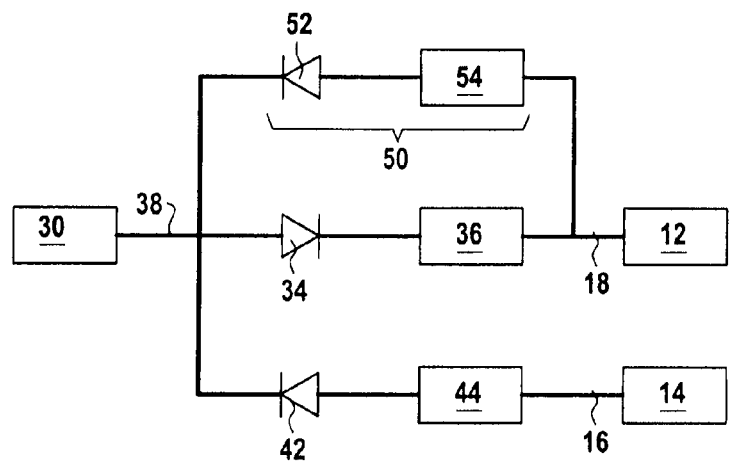
FIG. 3 is a diagram of a second embodiment of the invention in which the turbine engine includes first, second, and third coupling means.

With reference to FIG. 3, there follows a description of a second embodiment of the invention.

The turbine engine in the second embodiment of the invention differs from the first embodiment of FIG. 2 in that the reversible electric machine 30 is also suitable for being coupled to the shaft 18 of the gas generator, specifically via third deactivatable coupling means 50 suitable for transmitting rotary torque between the shaft 18 of the gas generator 12 and the shaft 38 of the reversible electric machine 30 operating as an electricity generator so that it produces electricity, advantageously when the free turbine is not rotating fast enough for the reversible electric machine 30 to be capable of generating electricity.

For example, arrangements are made for the third coupling means 50 to be activated when the free turbine 14 is blocked or turning at low speed, in particular when the helicopter is on the ground.

Under such circumstances, it is thus the gas generator 12 that drives rotation of the electric machine 30 in order to produce electricity, it being emphasized that the above-mentioned problem of the pilotability of the helicopter does not occur under these circumstances since the helicopter is on the ground.

Advantageously, the first, second, and third coupling means are configured so that only one of said coupling means is activated at a time.

Specifically, when the third coupling means 50 are activated, i.e. when the gas generator drives the reversible electric machine in rotation to act as an electricity generator, the first and second coupling means 32 and 40 are deactivated.

As can be seen in FIG. 3, the third coupling means 50 comprise a third freewheel 52, preferably similar to the first freewheel 34, and a third stepdown gear 54 having a third stepdown coefficient K3, which gear is disposed between the third freewheel 52 and the shaft 18 of the gas generator 12.

Specifically, the operating principle of the third coupling means 50 is similar to that of the first and second coupling means.

In order to ensure that, while in flight, the gas generator 12 does not drive rotation of the reversible electric machine 30 operating as a generator, it is appropriate to choose the stepdown coefficients K2 and K3 as follows, in addition to the above-mentioned condition concerning the stepdown coefficients K1 and K2:

$$\frac{K3}{K2} > \beta_{max} * \frac{|100\%\ NG|}{|100\%\ NTL|}$$

where $\beta_{MAX}$, a coefficient of proportionality, is preferably equal to the greatest value of the ratio:

$$\frac{NG(t)}{NTL(t)}, \forall\, t$$

In other words, the ratio of the third and second stepdown coefficients K3 and K2 is greater than a second limit value L2 where:

$$L2 = \beta_{max} * \frac{|100\%\ NG|}{|100\%\ NTL|}$$

For this second limit value L2, the inventors have found that the gas generator can never drive the reversible electric machine while the helicopter is in flight.

Figure 4:
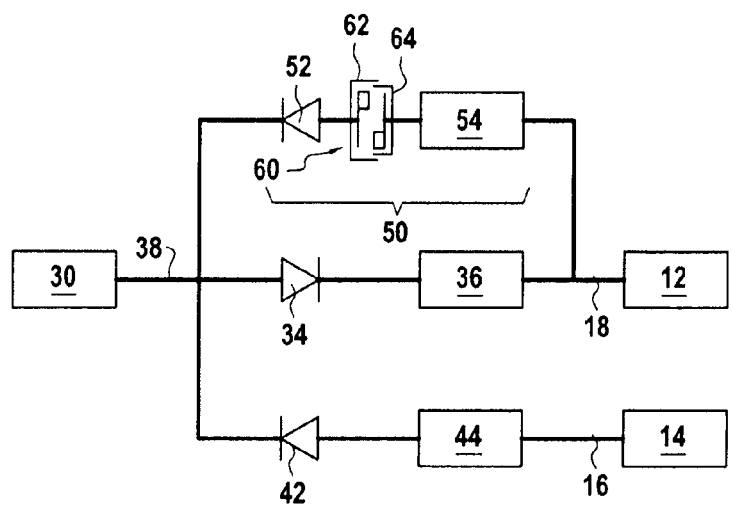
FIG. 4 is a diagram of a variant of the second embodiment of the invention as shown in FIG. 3, in which the coupling means also include a dog clutch.

In a variant of the second embodiment of the invention, as shown in FIG. 4, the third coupling means 50 also include a dog clutch 60, which is preferably located between the third freewheel 52 and the second stepdown gear 54.

More precisely, the dog clutch 60 has a first portion 62 secured to a peripheral ring of the third freewheel 52 and a second portion 64 fastened to the third stepdown gear 54.

The dog clutch 60 enables the third coupling means to be deactivated regardless of the activation state of the other coupling means, and regardless of the respective speeds of rotation of the gas generator 12, of the free turbine 14, and of the reversible electric machine 30.

One advantage of the dog clutch 60 is to ensure that the third coupling means are indeed deactivated while in flight. Under such circumstances, there is no need to specify the second limit value L2.

Furthermore, because of the presence of the third freewheel 52, the clutching and declutching can be performed easily since the first portion 62 of the dog clutch, fastened to the freewheel 52, does not oppose the torque opposing the second portion 64 of the dog clutch 60. Clutching and declutching are therefore performed at zero torque.

In another variant that is less advantageous, it is possible to omit the third freewheel 54 by using other systems: preferably a hydraulic coupler or a clutch or any other system suitable for this purpose.

The invention claimed is:
1. A turbine engine for a helicopter, comprising:
 a gas generator;
 a free turbine which is driven in rotation by a gas stream generated by the gas generator and which transmits rotary movement to a rotor of the helicopter, the free turbine being disposed downstream of the gas generator;
 a reversible electric machine including a shaft which is coupled to a shaft of the gas generator via a first deactivatable coupling device and which is coupled to a shaft of the free turbine via a second deactivatable coupling device,
 wherein the first deactivatable coupling device includes a first freewheel and a first stepdown gear having a first stepdown coefficient, wherein the second deactivatable coupling device includes a second freewheel, mounted in opposition of the first freewheel, and a second stepdown gear having a second stepdown coefficient, wherein, when the first deactivatable coupling device is activated during a stage of starting the turbine engine, rotation of the shaft of the reversible electric machine drives rotation of the shaft of the gas generator so that the reversible electric machine sets the gas generator into rotation, wherein, when the second deactivatable coupling device is activated after the turbine has started, rotation of the shaft of the free turbine drives rotation of the shaft of the reversible electric machine so that the reversible electric machine generates electricity, wherein, when the first deactivatable coupling device is deactivated, rotation of the shaft of the gas generator cannot drive rotation of the shaft of the reversible electric machine, wherein, when the second deactivatable coupling device is deactivated, rotation of the shaft of the reversible electric machine cannot drive rotation of the shaft of the free turbine, and wherein the first and second deactivatable coupling devices are not activated simultaneously.

2. A turbine engine according to claim 1, wherein a ratio of the first and second stepdown coefficients is less than a first limit value.

3. A turbine engine according to claim 2, wherein the reversible electric machine is configured to be coupled to the shaft of the gas generator by a third deactivatable coupling device, and wherein the first, second, and third coupling devices are configured such that only one of the first, second, and third coupling devices is activated at a time, wherein the third coupling device includes a third stepdown gear having a third stepdown coefficient, and wherein a ratio of the second and third stepdown coefficients is greater than a second limit value.

4. A turbine engine according to claim 3, wherein the second limit value is equal to $$\beta_{max} * \frac{|100\% \ NG|}{|100\% \ NTL|}$$

where
100% NG is a nominal speed of rotation of the shaft of the gas generator,
100% NTL is a nominal speed of rotation of the shaft of the free turbine, and
$\beta_{max}$ is a coefficient of proportionality equal to the greatest value of the ratio:

$$\frac{NG(t)}{NTL(t)}, \forall t.$$

5. A turbine engine according to claim 2, wherein the first limit value is equal to $$\lambda_{min} * \frac{|100\% \ NG|}{|100\% \ NTL|}$$

where
100% NG is a nominal speed of rotation of the shaft of the gas generator,
100% NTL is a nominal speed of rotation of the shaft of the free turbine, and
$\lambda_{min}$ is a proportionality coefficient equal to the smallest value of the ratio:

$$\frac{NG(t)}{NTL(t)}, \forall t.$$

6. A turbine engine according to claim 1, wherein the reversible electric machine is configured to be coupled to the shaft of the gas generator to generate electricity.

7. A turbine engine according to claim 1, wherein the reversible electric machine is configured to be coupled to the shaft of the gas generator by a third deactivatable coupling device, and wherein the first, second, and third coupling devices are configured such that only one of the first, second, and third coupling devices is activated at a time.

8. A turbine engine according to claim 7, wherein the third coupling device comprises a third freewheel.

9. A turbine engine according to claim 8, wherein the first and third freewheels are mounted in opposition.

10. A turbine engine according to claim 7, wherein the third coupling device further includes a dog-clutch.

11. A turbine engine according to claim 7, wherein the third coupling device includes a third stepdown gear having a third stepdown coefficient, and wherein a ratio of the second and third stepdown coefficients is greater than a second limit value.

12. A turbine engine according to claim 8, wherein the third coupling device includes a third stepdown gear having a third stepdown coefficient, and wherein a ratio of the second and third stepdown coefficients is greater than a second limit value.

13. A turbine engine according to claim 9, wherein the third coupling device includes a third stepdown gear having a third stepdown coefficient, and wherein a ratio of the second and third stepdown coefficients is greater than a second limit value.

14. A turbine engine according to claim 10, wherein the third coupling device includes a third stepdown gear having a third stepdown coefficient, and wherein ratio of the second and third stepdown coefficients is greater than a second limit value.

* * * * *

UNITED STATES PATENT AND TRADEMARK OFFICE
CERTIFICATE OF CORRECTION

PATENT NO. : 8,657,566 B2  
APPLICATION NO. : 12/934848  
DATED : February 25, 2014  
INVENTOR(S) : Olivier Bedrine et al.

It is certified that error appears in the above-identified patent and that said Letters Patent is hereby corrected as shown below:

In the Specification

Column 5, line 13, change "a free turbine turbine" to --a free turbine--;

Column 6, line 57, change "and K2of the" to --and K2 of the--; and

Column 7, line 65, change "and K3as follows" to --and K3 as follows--.

Signed and Sealed this
Eighth Day of July, 2014

Michelle K. Lee
*Deputy Director of the United States Patent and Trademark Office*